United States Patent
Florendo et al.

(10) Patent No.: US 11,755,565 B2
(45) Date of Patent: *Sep. 12, 2023

(54) HYBRID COLUMN STORE PROVIDING BOTH PAGED AND MEMORY-RESIDENT CONFIGURATIONS

(71) Applicant: SAP SE, Walldorf (DE)

(72) Inventors: Colin Florendo, Marlborough, MA (US); Mihnea Andrei, Issy les Moulineaux (FR); Amit Pathak, Pune (IN); Robert Schulze, Walldorf (DE); Adrian Dragusanu, North Vancouver (CA); Reza Sherkat, Waterloo (CA); Sebastian Seifert, Heidelberg (DE); Christian Lemke, Walldorf (DE)

(73) Assignee: SAP SE, Walldorf (DE)

( * ) Notice: Subject to any disclaimer, the term of this patent is extended or adjusted under 35 U.S.C. 154(b) by 0 days.

This patent is subject to a terminal disclaimer.

(21) Appl. No.: 17/496,108

(22) Filed: Oct. 7, 2021

(65) Prior Publication Data

US 2022/0027354 A1 Jan. 27, 2022

Related U.S. Application Data

(63) Continuation of application No. 16/866,766, filed on May 5, 2020, now Pat. No. 11,151,126.

(Continued)

(51) Int. Cl.
*G06F 16/24* (2019.01)
*G06F 16/23* (2019.01)
(Continued)

(52) U.S. Cl.
CPC ........ *G06F 16/2379* (2019.01); *G06F 3/0604* (2013.01); *G06F 3/064* (2013.01);
(Continued)

(58) Field of Classification Search
CPC ........... G06F 16/24552; G06F 16/2228; G06F 16/2219; G06F 12/0882; G06F 12/0246; G06F 16/24558; G06F 16/2237
See application file for complete search history.

(56) References Cited

U.S. PATENT DOCUMENTS 6,307,962 B1 * 10/2001 Parker .................... G06T 9/00
 382/237
9,292,549 B2 * 3/2016 Strenge ............... G06F 16/258
(Continued)

OTHER PUBLICATIONS

Abadi, S. et al., "The Design and Implementation of Modern Column-Oriented Database Systems," Foundations and Trends in Databases, vol. 5, No. 3, Now Publishers Inc., 2012, pp. 177-280.

(Continued)

*Primary Examiner* — Merilyn P Nguyen
(74) *Attorney, Agent, or Firm* — Sterne, Kessler, Goldstein & Fox P.L.L.C.

(57) ABSTRACT

Disclosed herein are system, method, and computer-program product embodiments for generating a paged and in-memory representation of a database object. An embodiment operates by maintaining in-memory and paged form primitives unique to the database object or a substructure thereof in a database such that the in-memory and paged form primitives are capable of providing the in-memory and paged representations of the database objects, respectively. Thereafter, a load configuration for the database object is determined. Based on the load configuration, the in-memory and/or paged representations of the database object are generated using the in-memory form primitive or the paged form primitive unique to the database object, respectively. Subsequently, the in-memory and/or paged representations of the database object are stored in the database.

20 Claims, 5 Drawing Sheets

Related U.S. Application Data

(60) Provisional application No. 62/858,693, filed on Jun. 7, 2019.

(51) Int. Cl.

| | |
|---|---|
| *G06F 12/02* | (2006.01) |
| *G06F 3/06* | (2006.01) |
| *G06F 16/22* | (2019.01) |
| *G06F 12/0882* | (2016.01) |
| *G06F 16/2455* | (2019.01) |
| *G06F 12/0875* | (2016.01) |
| *G06F 9/48* | (2006.01) |

(52) U.S. Cl.
CPC .......... *G06F 3/0673* (2013.01); *G06F 9/4843* (2013.01); *G06F 12/0223* (2013.01); *G06F 12/0246* (2013.01); *G06F 12/0875* (2013.01); *G06F 12/0882* (2013.01); *G06F 16/221* (2019.01); *G06F 16/2219* (2019.01); *G06F 16/2228* (2019.01); *G06F 16/2237* (2019.01); *G06F 16/2255* (2019.01); *G06F 16/2272* (2019.01); *G06F 16/2282* (2019.01); *G06F 16/24552* (2019.01); *G06F 16/24558* (2019.01); *G06F 2212/1024* (2013.01); *G06F 2212/1044* (2013.01)

(56) References Cited

U.S. PATENT DOCUMENTS

| | | | | |
|---|---|---|---|---|
| 9,317,208 | B2* | 4/2016 | Gurajada | G06F 3/0656 |
| 9,817,858 | B2 | 11/2017 | Eisenreich et al. | |
| 9,852,169 | B2 | 12/2017 | Faerber et al. | |
| 9,977,802 | B2* | 5/2018 | Florendo | G06F 16/22 |
| 9,990,308 | B2 | 6/2018 | Krishnappa et al. | |
| 10,037,270 | B2* | 7/2018 | Bak | G06F 12/023 |
| 10,552,058 | B1* | 2/2020 | Jadon | G06F 3/0647 |
| 10,602,225 | B2* | 3/2020 | Carney | H04N 21/47 |
| 10,831,787 | B2* | 11/2020 | Povalyayev | G06F 16/2237 |
| 11,151,126 | B2 | 10/2021 | Florendo et al. | |
| 11,502,705 | B2* | 11/2022 | Lasch | G06F 16/221 |
| 11,562,085 | B2* | 1/2023 | Hariharasubrahmanian | |
| | | | | G06F 21/6209 |
| 2002/0199096 | A1* | 12/2002 | Wenocur | H04L 63/12 |
| | | | | 713/153 |
| 2003/0023628 | A1* | 1/2003 | Girardot | G06F 9/547 |
| | | | | 715/202 |
| 2003/0041110 | A1* | 2/2003 | Wenocur | H04L 63/104 |
| | | | | 709/206 |
| 2004/0062453 | A1* | 4/2004 | Ludwig | G06T 5/003 |
| | | | | 382/280 |
| 2009/0327621 | A1* | 12/2009 | Kliot | G06F 12/0253 |
| | | | | 711/E12.002 |
| 2010/0278446 | A1* | 11/2010 | Ganesh | G06F 16/221 |
| | | | | 382/243 |
| 2012/0284461 | A1* | 11/2012 | Larin | G06F 9/30178 |
| | | | | 712/205 |
| 2013/0346700 | A1* | 12/2013 | Tomlinson | G06F 9/526 |
| | | | | 711/E12.07 |
| 2015/0032757 | A1* | 1/2015 | Barykin | G06F 16/2228 |
| | | | | 707/741 |
| 2015/0089134 | A1 | 3/2015 | Mukherjee et al. | |
| 2015/0143125 | A1* | 5/2015 | Nix | H04L 12/2854 |
| | | | | 713/171 |
| 2015/0242309 | A1* | 8/2015 | Talagala | G06F 3/064 |
| | | | | 711/103 |
| 2016/0012089 | A1 | 1/2016 | Sherkat et al. | |
| 2016/0041906 | A1 | 2/2016 | Mukherjee et al. | |
| 2016/0085955 | A1* | 3/2016 | Lerner | H04L 9/0869 |
| | | | | 726/20 |
| 2016/0127802 | A1* | 5/2016 | Carney | H04N 21/4622 |
| | | | | 725/14 |
| 2016/0299944 | A1* | 10/2016 | Isaacson | G06F 16/2453 |
| 2017/0322960 | A1 | 11/2017 | Glebe et al. | |
| 2017/0329619 | A1* | 11/2017 | Craik | H03M 7/6011 |
| 2017/0364554 | A1 | 12/2017 | Nica et al. | |
| 2018/0137176 | A1* | 5/2018 | Geissinger | G06F 16/24561 |
| 2019/0324676 | A1* | 10/2019 | Bensberg | G06F 3/0643 |
| 2020/0125668 | A1* | 4/2020 | Psaroudakis | G06F 16/27 |
| 2021/0163894 | A1* | 6/2021 | Klechevsky | C07K 14/55 |

OTHER PUBLICATIONS

Aken, D.V. et al., "Automatic Database Management System Tuning Through Large-scale Machine Learning," ACM SIGMOD '17, May 14-19, 2017, pp. 1009-1024.

Alexiou, K. et al. "Adaptive Range Filters for Cold Data: Avoiding Trips to Siberia," Proc. of the VLDB Endowment, vol. 6, No. 14, 2013, pp. 1714-1725.

Anderson, T., "Microsoft SQL Server 14 man: Nothing stops a Hekaton transaction," The Register, printed from http://www.theregister.co.uk/2013/06/03/microsoft_sql_server_14_teched/, Jun. 3, 2013, 8 pages.

Andrei, M. et al., "SAP HANA Adoption of Non-Volatile Memory," Proc. of the VLDB Endowment, vol. 10, No. 12, 2017, pp. 1754-1765.

Anh, V.N. and Moffat, A., "Index compression using 64-bit words," Software—Practice and Experience, vol. 40, 2010, pp. 131-147.

Arulraj, J. et al., "Multi-Tier Buffer Management and Storage System Design for Non-Volatile Memory," arXiv:1901.10938v1 [cs.DB], Jan. 30, 2019, 17 pages.

Belazzougui, D. et al., "Hash, displace, and compress," Algorithms—ESA 2009, Proc. 17th Annual European Symposium, Copenhagen, Denmark, Sep. 7-9, 2009, pp. 682-603.

Bhattacharjee, B. et al., "Efficient Index Compression in DB2 LUW," VLDB '09, vol. 2, No. 2, 2009, pp. 1462-1473.

Do, J. et al., "Turbocharging DBMS Buffer Pool Using SSDs," ACM SIGMOD, 2011, pp. 1113-1124.

Eldawy, A. et al., "Spatial Partitioning Techniques in SpatialHadoop," Proc. of the VLDB Endowment, vol. 8, No. 12, 2015, pp. 1602-1605.

Elghandour, I. et al., "An XML Index Advisor for DB2," ACM SIGMOD'08, Jun. 9-12, 2008, 4 pages.

Finkelstein, S. et al., "Physical Database Design for Relational Databases," ACM Trans. on Database Systems, vol. 13, No. 1, Mar. 1988, pp. 91-128.

Graefe, G. et al., "In-memory Performance for Big Data," Proc. of the VLDB Endowment, vol. 8, No. 1, 2014, pp. 37-48.

Graefe, G., "Volcano—An Extensible and Parallel Query Evaluation System," IEEE Trans. on Knowledge and Data Engineering, vol. 6, No. 1, Feb. 1994, pp. 120-135.

Gurajada, A. et al., "BTrim—Hybrid In-Memory Database Architecture for Extreme Transaction Processing in VLDBs," Proc. of the VLDB Endowment, vol. 11, No. 12, 2018, pp. 1889-1901.

Lang, H. et al., Data Blocks: Hybrid OLTP and OLAP on Compressed Storage using both Vectorization and Compilation. ACM SIGMOD, 2016, pp. 311-326.

Larson, P. et al., "Real-Time Analytical Processing with SQL Server," Proc. of the VLDB Endowment, vol. 8, No. 12, Aug. 31-Sep. 4, 2015, pp. 1740-1751.

Lee, J. et al., "Hybrid Garbage Collection for Multi-Version Concurrency Control in SAP HANA," ACM SIGMOD, Jun. 26-Jul. 1, 2016, pp. 1307-1318.

Leis, V. et al., "LeanStore: In-Memory Data Management Beyond Main Memory," IEEE ICDE, 2018, pp. 185-196.

Lemke, C. et al., "Speeding Up Queries in Column Stores—A Case for Compression," DAWAK, 2010, pp. 117-129.

Liu, X. and Salem, K., "Hybrid Storage Management for Database Systems," Proc. of the VLDB Endowment, vol. 6, No. 8, Aug. 26-30, 2013, pp. 541-552.

Majewski, B.S. et al., "A Family of Perfect Hashing Methods," The Computer Journal, vol. 39, No. 6., 1996, pp. 547-554.

May, N. et al., "SAP HANA—The Evolution of an In-Memory DBMS from Pure OLAP Processing Towards Mixed Workloads," BTW, 2017, pp. 545-563.

(56) References Cited

OTHER PUBLICATIONS

Menon, P. et al., "Relaxed Operator Fusion for In-Memory Databases: Making Compilation, Vectorization, and Prefetching Work Together at Last," Proc. of the VLDB Endowment, vol. 11, No. 1, 2017, pp. 1-13.

Müller, I. et al., "Adaptive String Dictionary Compression in In-Memory col. Store Database Systems," Open Proceedings, 10.5441/002/edbt.2014.27, 2014, pp. 283-294.

Müller, I. et al., "Retrieval and Perfect Hashing Using Fingerprinting," J. Gudmundsson and J. Katajainen (Eds.), SEA 2014: Experimental Algorithms, Springer International Publishing, 2014, pp. 138-149.

Nehme, R. and Bruno, N., "Automated Partitioning Design in Parallel Database Systems," In ACM SIGMOD, 2011, pp. 1137-1148.

Neumann, T., Efficiently Compiling Efficient Query Plans for Modern Hardware, Proc. of the VLDB Endowment, vol. 4, No. 9, 2011, pp. 539-550.

Nica, A. et al., "Statisticum: Data Statistics Management in SAP HANA," Proc. of the VLDB Endowment, vol. 10, No. 12, 2017, pp. 658-1669.

On, S.T. et al., "FD-Buffer: A Buffer Manager for Databases on Flash Disks," ACM CIKM '10, Oct. 25-29, 2010, pp. 1297-1300.

Oracle® Database—Database In-Memory Guide, 19c, E96137-03, downloaded from https://docs.oracle.com/en/database/oracle/oracle-database/19/inmem/, Copyright 2016, 2020, 255 pages.

Pathak, A. et al., "Adaptive storage and access for simplified data management," *DaMoN* '19, Jul. 1, 2019, 6 pages.

Plaisance, J. et al., "Vectorized VByte Decoding," $1^{st}$ Int'l Symp. on Web AlGorithms, Jun. 2015, 7 pages.

Plattner, H., "The Impact of Columnar In-memory Databases on Enterprise Systems: Implications of Eliminating Transaction-Maintained Aggregates," Proc. of the VLDB Endowment, vol. 7, No. 13, Sep. 1-5, 2014, pp. 1722-1729.

Poess, M. and Potapov, D., "Data Compression in Oracle," Proc. of the VLDB Conference, 2003, pp. 937-947.

Sacco, G.M. and Schkolnick, M., "A Mechanism For Managing The Buffer Pool In A Relational Database System Using The Hot Set Model," Proc. of the Eighth Int'l. Conf. on Very Large Data Bases, Sep. 1982, pp. 257-262.

Sherkat, R. et al., "Page As You Go: Piecewise Columnar Access In SAP HANA," ACM SIGMOD '16, Jun. 26-Jul. 1, 2016, pp. 1295-1306.

Stoica, R. and Ailamaki, A., Enabling Efficient OS Paging for Main-Memory OLTP Databases. ACM DaMoN '13. 2013, 7 pages, 2013.

Willhalm, T. et al., "Vectorizing Database Column Scans with Complex Predicates," ADMS 2013, pp. 1-12.

Xie, D. et al., "Simba: Efficient In-Memory Spatial Analytics," ACM SIGMOD '16, Jun. 26-Jul. 1, 2016, pp. 1071-1085.

Zilio, D.C. et al., "DB2 Design Advisor: Integrated Automatic Physical Database Design," Procs. Of the $30^{th}$ VLDB Conference, 2004, pp. 1087-1097.

* cited by examiner

HYBRID COLUMN STORE PROVIDING BOTH PAGED AND MEMORY-RESIDENT CONFIGURATIONS

CROSS-REFERENCE TO RELATED APPLICATIONS

This application is a continuation of U.S. patent application Ser. No. 16/866,766, filed May 5, 2020, now allowed and granted on Oct. 19, 2021 as U.S. Pat. No. 11,151,126, which claims the benefit of U.S. Provisional Patent Application No. 62/858,693, filed on Jun. 7, 2019, all of which are herein incorporated by reference in their entirety.

BACKGROUND

Current databases can store database objects in an in-memory column store or a paged column store depending on the workload. Accordingly, storing the database objects in the in-memory column store may be preferable for some workloads, whereas storing the database objects in the paged column store may be preferable for other workloads. However, the implementation (e.g., coding) and data layout for storing the database objects in the in-memory column store is different from the configuration for storing the database objects in the paged column store. Accordingly, switching between the two configurations requires a full rewrite of the data persistence. This requires additional effort for performing each rewrite, which consumes significant amounts of memory and processing resources. Also, code reading from and writing to in-memory and paged data needs to be different, which, as, a result, is costlier and more susceptible to divergence and bugs, since similar logic is being implemented twice

BRIEF DESCRIPTION OF THE DRAWINGS

The accompanying drawings, which are incorporated herein and form a part of the specification, illustrate embodiments of the present disclosure and, together with the description, further serve to explain the principles of the disclosure and to enable a person skilled in the arts to make and use the embodiments.

In the drawings, like reference numbers generally indicate identical or similar elements. Additionally, generally, the left-most digit(s) of a reference number identifies the drawing in which the reference number first appears.

DETAILED DESCRIPTION

Figure 1:
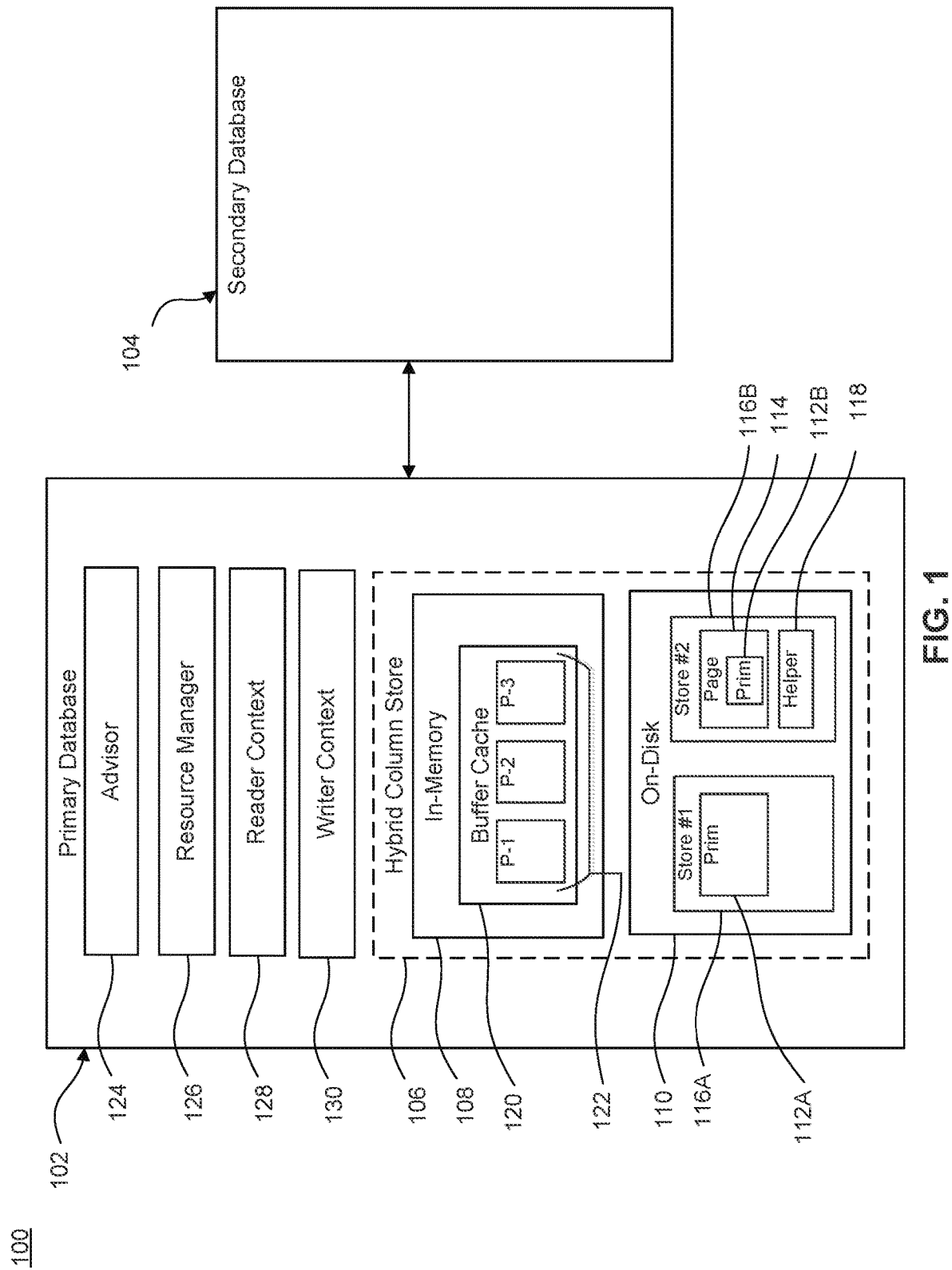
FIG. 1 illustrates a database system for providing a hybrid column store, according to some embodiments.

Provided herein are system, apparatus, device, method and/or computer program product embodiments, and/or combinations and sub-combinations thereof, for providing on-demand switching of database objects between paged and in-memory data formats.

In some embodiments, a primary database can include a hybrid column store, a reader context, a writer context, an advisor, and/or a resource manager. The hybrid column store can include an in-memory store and an on-disk store. The in-memory store can include a buffer cache. The on-disk store can include an in-memory primitive store and a paged primitive store. The paged primitive store can include one or more pages and one or more helpers.

For each database object (e.g., a database column) and/or its subcomponents (a data vector, a dictionary, and/or an index), the primary database can derive a primitive by performing one or more compression schemes on the database objects and/or its subcomponents. After doing so, the primary database can store an in-memory form (hereinafter "in-memory form primitive") and a paged form (hereafter "paged form primitive") in the on-disk store. In storing the in-memory form primitive, the primary database may store the compressed version of the database object and/or its substructures as a contiguous block of data in the in-memory primitive store. And, in storing the on-disk form primitive, the primary database may store the compressed version of the database object and/or its substructures on one or more pages of the paged primitive store.

Accordingly, based on a load configuration, the primary database can store an in-memory representation of the database object and/or its substructures using the in-memory form primitive. Similarly, based on the load configuration, the primary database can store the database objects and/or its substructures using the paged form primitive. In storing the in-memory representation, the primary database can load the compressed version of the entire database object and/or its subcomponents into the in-memory store. Alternatively, the primary database can also decompress and load the entire database object and/its subcomponents into the in-memory store. Further, in storing the paged representation, the primary database can load one or more pages storing data of the database object and/or its substructures into the buffer cache. Alternatively, the primary database can also decompress the one or more pages storing data of the database object and/or its substructures store them on one or more pages, and load the pages into the buffer cache. Accordingly, unlike in-memory representation, the paged representation can correspond to a portion of the database object and/or its substructures.

Further, based on an updated load configuration, the primary database can modify the storage of the database object and/or its substructure. For example, the primary database can generate and/or store an in-memory representation of the database object and/or its substructures in the in-memory store using the paged representation of the database objects and/or its substructures stored pages maintained by the buffer cache. Similarly, the primary database can generate and store an in-memory representation of different database objects and/or substructures in the in-memory store using their in-memory primitive, as well as store a paged representation of different database objects and/or substructures into buffer cache using their paged memory primitive. Further, the primary database can drop the in-memory representation of the database object and/or its substructures from the in-memory store, as well as the paged representation of the database object and/or its substructures from the buffer cache.

By operating in such a fashion, the database can seamlessly convert between in-memory and paged representations of the database object without requiring additional processing power, content re-writing, and coding. In turn, the database can provide a lower and/or optimal total cost of ownership.

FIG. 1 illustrates database system 100 that includes primary database 102 and, optionally, secondary database 104. Primary database 102 can provide on-demand switching of database objects between paged and in-memory data formats, according to some embodiments. The database object can be a column of a database table. For example, in some embodiments, a database table can have a column of identifiers (e.g., 1, 2, 3, 4, etc.) and one or more columns of attributes (e.g., artist, song, genre, etc.) corresponding to the identifiers. Accordingly, the database table can include multiple database objects. Along these lines, in some embodiments, primary database 102 can store the database objects in a columnar fashion such that the first column, the second column, and the third column sequentially follow each other.

Further, in some embodiments, primary database 102 can store each database object as a plurality of substructures that collectively forms and represent the database object. For example, for each column, the database object's substructures can include a dictionary and a data vector, and, optionally, an index. The dictionary can associate each unique data value with an associated value identifier. The value identifiers can be numbered sequentially. For example, a database table's first column can include the data values of "Italy," "Germany," "Italy," "South Korea," "China," "Italy," "Germany," "United States," and "China." Primary database 102 can then identify and extract unique data values from the database table's column—e.g., "China," "Germany," "Italy," "South Korea," "United States"—and assign a sequential value identifier—e.g., value identifiers of "0" for "China," "1" for Germany," "2" for "Italy," "3" for "South Korea," and "4" for "United States." The dictionary can thus be the association of the value identifiers with the unique data values of the database table's first column.

After deriving the dictionary, primary database 102 can determine the data vector representative of the database object. To do so, primary database 102 can replace the data values of the database object with the representative value identifier. For example, the values of the database object can be replaced with the associated value identifier, as specified in the dictionary. For example, as stated above, the database object can sequentially list data values of "Italy," "Germany," "Italy," "South Korea," "China," "Italy," "Germany," "United States," and "China." And, the value identifiers for the data values can be "0" for "China," "1" for Germany," "2" for "Italy," "3" for "South Korea," and "4" for "United States." Accordingly, the data vector representing the database object can include value identifiers "2," "1," "2," "3," "0," "2," "1," "4," and "0."

After deriving the dictionary, primary database 102 can also derive an index for determining a position in the data vector containing a given value identifier. Accordingly, the index can include a sequential listing of each unique value identifier and one or more positions (e.g., one or more rows) in the data vector containing the value identifier. For example, as illustrated above, the database object's data vector can include value identifiers "2," "1," "2," "3," "0," "2," "1," "4," and "0." Thus, the sequential listing of the unique value identifiers can be "0," "1," "2," "3," and "4." And, the value identifier "0" can be associated with rows "5" and "9," the value identifier "1" can be associated with rows "2" and "7," the value identifier "2" can be associated with rows "1," "3," and "6," the value identifier "3" can be associated with row "4," and the value identifier "4" can be associated with row "8."

Accordingly, primary database 102 can include hybrid column store 106, which includes in-memory store 108 and on-disk store 110. Primary database 102 can derive a primitive for each database object (e.g., a database column) and/or its substructures (e.g., dictionary, data vector, and/or index) and store the primitive in on-disk store 110. As described above, a database object can contain one or more values, and a database object's structures can contain one more values and one or more value identifiers corresponding to the values. Consequently, the database objects and/or its substructures may contain duplicate values and/or value identifiers. Thus, each primitive may contain a compressed version of the database object's and/or its substructure's values and/or value identifiers.

For deriving the primitive, primary database 102 can perform one or more compression schemes on the database object and/or its substructures. For a database object (e.g., a column), primary database 102 can store the content (e.g., integers) in a block and provide a compression scheme on each block. Example compression schemes may include n-bit compression, range compression, and offset compression, to provide a few examples.

For example, the database object can be a column containing integers "6," "9," "8," "7," "15," "13," "13," "20," "14," "10," "22," and "12." Primary database 102 can then store the column's integers on three blocks, where the first block stores integers "6," "9," "8," and "7," the second block stores integers "15," "13," "13," and "20," and the third block stores integers "14," "10," "22," and "12." Primary database 102 can then perform an offset compression on the blocks, although other compression schemes as discussed above can also be performed. By performing the offset compression, primary database 102 can first determine the minimum value for each block—i.e., "6" for the first block, "13" for the second block, and "10" for the third block. Primary database 102 can then subtract the minimum value for each block's elements—i.e., the first block stores integers "0," "3," "2," and "1," the second block stores integers "2," "0," "0," and "7," and the third block stores integers "4," "0," "12," and "2." This can significantly reduce the size of the values stored in each block, especially for larger blocks (e.g., 1024 values per block) and large offsets). As a result, primary database 102 is able to represent the integers with less bits, thus reducing their storage size.

For the database object's substructures, primary database 102 may derive the primitive by applying one or more compression schemes based on the type of substructure. For the data vector, the compression schemes may include run-length encoding, prefix encoding, sparse encoding, cluster encoding, and/or indirect encoding, to name a few examples. For the dictionary, the compression schemes may include front coding, hu-tucker coding, re-pair coding, n-gram coding, and/or hashing, to provide some examples. For the index, the compression schemes may include golomb coding, VByte coding, and/or simple-8b coding, to name some examples.

For example, primary database 102 can determine that the database object's data vector includes value identifiers "0," "0," "1," "1," "1," "1," "1," "0," "2," "2," "2," "2," "2," "0," "0," "1," "1," "1," "1," "1," "1," "1," and "1." For deriving the compressed version of the data vector, primary database 102 can perform run-length decoding and replace each run of a value identifier from the list of data values by the value and its count. Accordingly, primary database 102 can provide a compressed version of the data vector as (2, 0), (5, 1), (1, 0), (5, 2), (2, 0), and (8, 1)—i.e., two zeros, followed by five ones, followed by one zero, etc.

Accordingly, the primitive can provide the value and/or value identifiers in one or more predefined formats. The predefined format can be a vector, an n-bit compressed integer vector, a bit vector, a variable width vector, to provide a few examples. The vector can provide the data as a list of values. The n-bit compressed integer vector can provide a compressed version of the data having a predefined number of bytes based on the number of the data values. For example, if there are twelve data values and the largest value is 250, the n-bit compressed integer vector can provide the primitives in a one-byte representation, as would be understood by a person of ordinary skill in the art. The bit vector can provide the data values as a list of ones and zeros or as a 1-bit compressed integer vector. The variable-width vector can provide a vector of data values having a width based on the number of data values such that the substructure's elements are not limited to a fixed width.

Further, after determining the primitive, primary database 102 can save the primitive in either an in-memory or a paged form (hereafter referred to in-memory form primitive 112A and paged form primitive 112B) in on-disk store 110. In doing so, for in-memory form primitive 112, primary database 102 can save the compressed version of the database object and/or its substructures (e.g., the values and/or value identifiers) as a contiguous block of data in on-disk store 110. For paged form primitive 112B, primary database 102 can save the compressed version of the database object and/or its substructures (e.g., the values and/or value identifiers) on one or more pages 114. In turn, in-memory form primitive 112A can provide the compressed version of the database objects and/or its substructure as a contiguous block of data. Paged form primitive 112B can include one or more pages 114 comprising the compressed version of the database objects and/or its substructures.

Further, as described above, for deriving the primitive of the database object and/or its substructures, primary database 102 can perform different compression schemes. And based on the compression scheme, the data of the primitive can be in different predetermined formats. Accordingly, primary database 102 can derive data of a primitive having different formats using different compression schemes. Thus, in some embodiments, primary database 102 can save the primitive in a first format as in-memory form primitive 112A and in a second format as a paged form primitive 112B. For example, for a database object and/or its substructure, in-memory form primitive 112A can include data in the form of a bit vector, whereas paged form primitive 112B can include data in the form of a paged n-bit compressed integer vector.

Along these lines, in-memory and paged form primitives 112A and 112B can each have one or more application program interfaces (APIs) that hide their in-memory or paged nature. For example, in-memory form primitive 112A can include an n-bit compressed vector, which can provide a compressed representation of values in contiguous memory, while the corresponding paged form primitive 112B provides the same compressed byte compatible representation on one or more pages. In-memory and paged form primitives 112A and 112B can have APIs that do not indicate that the data values are stored as an n-bit compressed vector in contiguous memory on in one or more pages, respectively. In some embodiments, in-memory and paged form primitives 112A and 112B can have the same APIs.

Figure 2:
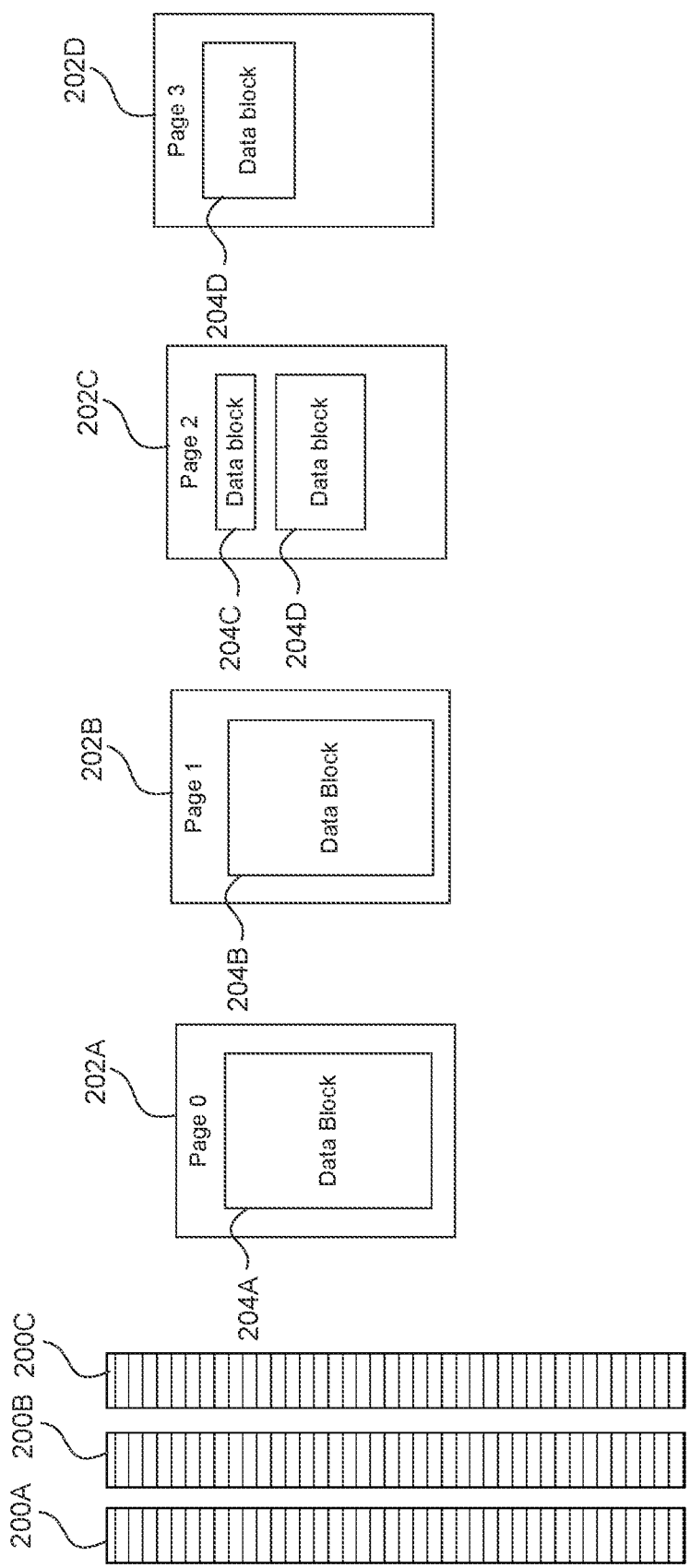
FIG. 2 illustrates a paging of a primitive of a database object and a substructure of the database object, according to some embodiments.

FIG. 2 illustrates a paged representation of a primitive of one or more database objects and/or one or more of a database object's substructures, according to some embodiments. As described above, a database object can be a database column, which can be represented by one or more substructures (e.g., a data vector, a dictionary, and, optionally, an index). The database object and/or its substructures can include one or more values and/or value identifiers. Accordingly, primary database 102 (of FIG. 1) can determine a primitive serving as a compressed version of the database objects and/or its substructure. In turn, the primitive may include one or more values and/or value identifiers.

Data vectors 200A-C can represent database objects and/or substructures. In some embodiments, the database objects and/or substructures can be of different sizes, and thus the corresponding data vectors 200A-C can be of different sizes. In some embodiments, the database objects and/or substructures—and corresponding data vectors 200A-C—can be chosen intentionally to store these data structures in contiguous memory.

For storing a particular data vector 200A, primary database 102 (of FIG. 1) can analyze a chain of pages 202A-D, which may include page 202A, followed by page 202B, followed by page 202C, followed by page 202D, and followed possibly by additional pages (not illustrated). Primary database 102 can then identify the first page 202A having unutilized memory. Primary database 102 can analyze page 202A to determine if it has sufficient unutilized memory for storing the object in its entirety. If not possible, primary database 102 can then store the object on multiple pages 202A-D. Primary database 102 can then create data blocks 204A-D depending on the size of the data vectors 200A and the size of pages 202A-D. Accordingly, data blocks 204A-D cannot be larger than pages 202A-D.

For example, as illustrated, primary database 102 (of FIG. 1) can determine that the data of data vector 200A can be stored entirely on page 202A. Thus, primary database 102 can store a single data block 204A—representing data vector 200A—on page 202A. Data block 204A can fully utilize page 202A's storage capacity. Thereafter, primary database 102 can determine that the data of data vector 200B exceeds page 202B's storage capacity, which follows page 202A. In doing so, primary database 102 can determine that data of data vector 200B requires utilizing all of page 202B and at least a portion of page 202C. Therefore, primary database 102 can create multiple data blocks 204B and 204C representing data of data vector 200B. As illustrated, data block 204B can represent a larger portion of data vector 200B than data block 204C. Accordingly, data blocks 204B and 204C can be of different sizes and represent the same data vector 200B. Primary database 102 can then store data blocks 204B and 204C on pages 202B and 202C, respectively. Data block 204B can utilize the entire page 202B's capacity. Data block 204C can utilize a portion of pages 202C's capacity.

Further, primary database 102 (of FIG. 1) can determine that the data of data vector 200C can be entirely stored on page 202C, which, as described above, also stores data block 204C. Accordingly, primary database 102 can create data block 204D representing data vector 200C. Primary database 102 can then store data block 204D on page 202C. Data block 204D can utilize at least a portion of pages 202C's capacity. Accordingly, data blocks 204C and 204D—representing data vectors 200C and 200D, respectively—utilize all or a portion of page 202C's capacity.

As described above, in some embodiments, pages 202A and 202B can be fully utilized and store a single data block 204A-B. In some embodiments, page 204C can be partially utilized and store multiple data blocks 204C and 204D. Further, in some embodiments, page 202D can be partially utilized and can store a single data block 204D. Thus, pages 202A-D can store one or multiple data blocks 204A-D and correspond to the same or different data vectors 200A-C. And, where there are multiple data bocks 204A-D, each data block 204A-D can include all or part of the database objects and/or its substructures (e.g., a data vector, a dictionary, and, optionally, an index).

Along these lines, primary database 102 (of FIG. 1) can align data blocks 204A-D on pages 202A-D. In doing so, in some embodiments, primary database 102 can offset each data block 204A-D by a nonzero number of bytes (e.g., 8 bytes, 16 bytes, 22 bytes). Thus, primary database 102 can save data blocks 204 that are not the first data block on pages 202A-D at a byte divisible by the nonzero number of bytes (e.g., 16). For example, if data block 204C ends on page 202C's byte 120, primary database 102 can store data block 204D at pages 202C's byte 128—which is the first byte after byte 120 divisible by 16. This can allow the data blocks to be loaded faster.

Referring to FIG. 1, while storing the paged form primitive 114 one or more pages 116, for each page 116, primary database 102 can create helper 118 storing a location of value and/or value identifier on each page 116. In some embodiments, where pages 114 store a sorted set of values and/or value identifiers, helper 118 can be a page sort index that stores the last value for each page 114. Accordingly, instead of analyzing each page 114 to identify the location of a desired value and/or value identifier, primary database 102 can utilize helper 118, thus reducing the number of times primary database 102 accesses (e.g., loads) pages 114 into buffer cache 120 for analyzing.

After creating the in-memory and paged form primitives 112A and 112B, primary database 102 may save them in on-disk store 110's in-memory and paged primitive store 116A and 116B, respectively. In turn, in-memory and paged primitive store 116A and 116B may store one or more in-memory and paged primitives 112A and 112B. For example, in-memory and paged primitive store 116A and 116B may store an in-memory and paged form of one primitive and another in-memory and paged form of another primitive. Along these lines, paged primitive store 116B can include one or more pages 114 storing data of one or more paged form primitives 112B, as explained above with respect to FIG. 2.

By having in-memory and paged form primitives 112A and 112B, primary database 102 can provide a byte-compatible representation of each database object and/or its substructures (e.g., a data vector, a dictionary, and, optionally, an index) in an in-memory form and a paged form. In turn, by using their in-memory and paged form primitives 112A and 112B, primary database 102 can provide a unified persistence format for loading either in-memory or paged version of the database objects and/or its substructures. The unified persistence format can thus permit loading a paged version of the database object and/or its substructures without rewriting an in-memory version of the database object and/or its substructures. Likewise, the unified persistence format can thus permit loading an in-memory version of the database object and its substructures without rewriting a paged version of the database object and/or its substructures.

Accordingly, in some embodiments, primary database 102 can load one or more pages 114 of paged form primitive 112B into buffer cache 120. As explained above with respect to FIG. 2, pages 114 can contain data relating to all or part of the database object and/or its substructures and, possibly, data of another database objects and/or its substructures. In turn, primary database 102 can load pages 114 containing all or part of the database object and/or its substructures into buffer cache 120.

Along these lines, primary database 102 can also decompress the compressed data stored on one or more pages 114 of paged form primitive 112B. As explained above, the compressed data stored on a particular page of 114 of paged form primitive 112B can be all or part of the database objects and/or its substructures. For example, the compressed data of paged form primitive 112B can be stored across multiple pages 114. Accordingly, by decompressing the compressed data stored on one or more pages 114 of paged form primitive 112B, primary database 102 can be deriving all or part of the original database objects and/or its substructures.

After deriving all or part of the original database objects and/or its substructures from paged form primitive 112B, primary database 102 can store the original database object and/or its substructures on one or more pages in a similar fashion as described with respect to FIG. 2. For example, based on the size of the original database object and/or its substructures and the size of the available page, the original database object and/or its substructures may be stored on one or more multiple pages. Primary database 102 can then store the pages in buffer cache 120.

Accordingly, buffer cache 120 can store one or more pages 122 that each store a compressed or decompressed version of all or part of the database objects and/or its substructures. For example, buffer cache 120 can store a particular page 122 retrieved from paged form primitive 112B, where the page 122 contains a compressed version of all or part of the database object and/or its substructures. Buffer cache 120 can also store another page 122 derived from the same or different page of paged primitive store 116B and thus storing all or part of the same or different database object and/or its substructures.

Therefore, when needed, primary database 102 can load the decompressed version of all or part of the database object and/or its substructures stored on buffer cache 120's pages 122 into in-memory store 108, for example, as a data vector 202A-C (of FIG. 2). Primary database 102 can also decompress the compressed version of all or part of the database object and/or its substructures stored on buffer cache 120's pages 122 and then load it into in-memory store 108, for example, as a data vector 202A-C. As stated above, the compressed or uncompressed data stored on buffer cache 120's pages 122 may relate to all or part of the database object and/or its substructures. Accordingly, by loading data from buffer cache 120's pages 122 into in-memory store 108, in-memory store 108 may store all or part of the database object and/or its substructures.

Further, primary database 102 can also load data of in-memory form primitive 116 into in-memory store 108. As stated above, in-memory form primitive 116 can store compressed data relating to the database object and/or its substructures as a contiguous block of data. Accordingly, primary database 102 can decompress the compressed data (e.g., the entire block of data) and load the data into in-memory store 108 as a data vector 202A-C.

Figure 3:
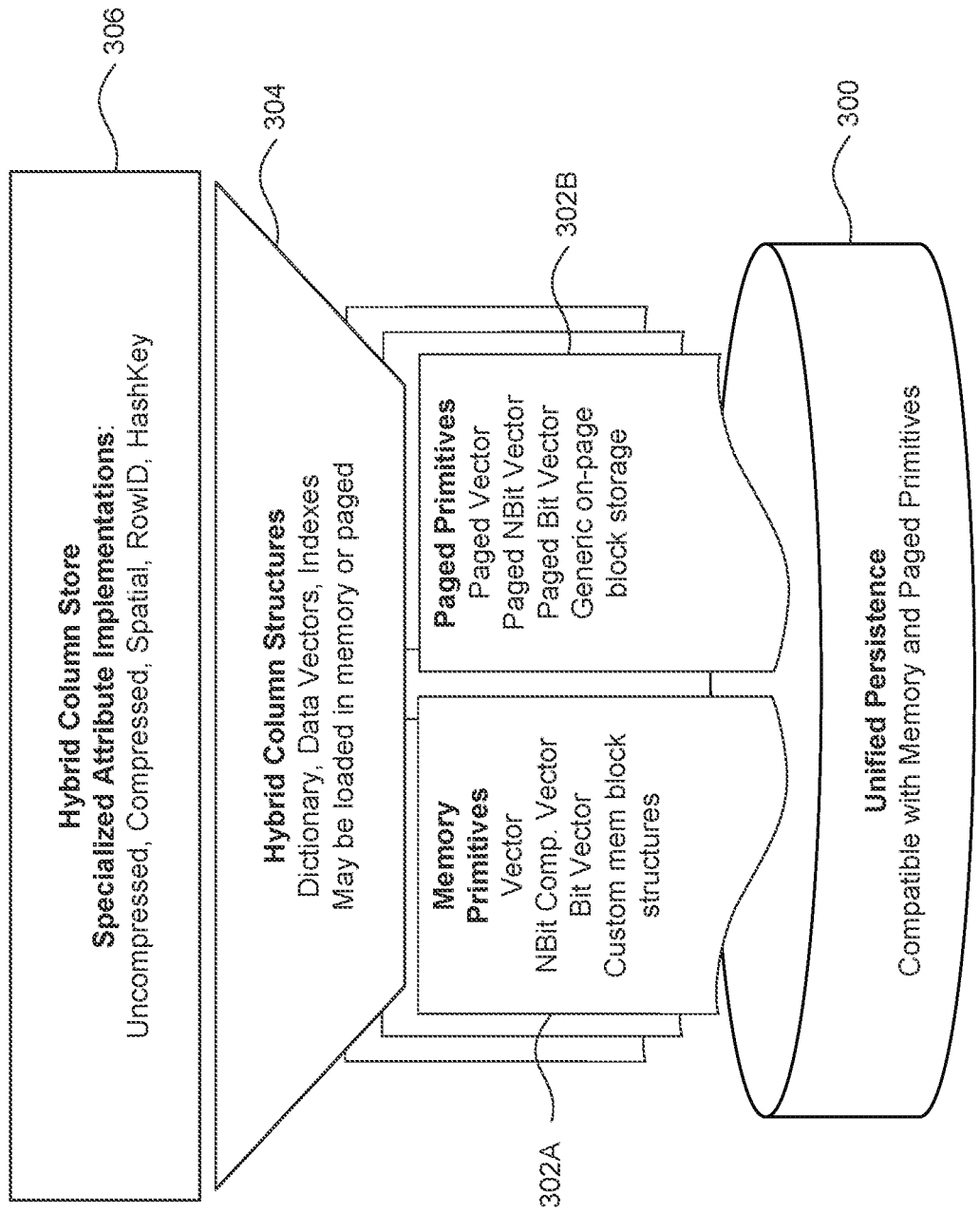
FIG. 3 illustrates example implementations of a paged and in-memory form primitive, according to some embodiments.

FIG. 3 illustrates implementations of primitives creating substructures (e.g., a dictionary, a data vector, and, optionally, an index) of a database object (e.g., a database column), according to some embodiments. As described above, primary database 102 (of FIG. 1) can create substructures that collectively represent the database object. In addition, for each substructure, primary database 102 can derive a primitive having one or more data values and/or value identifiers using one or more compression schemes. Based on the compression scheme, the primitive can have one or more predefined formats, such as a vector, an n-bit compressed integer vector, a bit vector, a variable width vector, to provide a few examples.

Primary database 102 can then save an in-memory form of the primitive (hereinafter referred to in-memory form primitive 302A) and a paged form of the primitive (hereinafter referred to as paged form primitive 302B). In turn, based on the type of compression scheme, in-memory and paged form primitives 302A and 302B can have the same or different formats. Further, primary database 102 can save in-memory form primitive 302A as a contiguous block of data in on-disk store 110 (of FIG. 1). Primary database 102 can store paged form primitive 302B on one or more pages 114 (of FIG. 1) of on-disk store 110.

In doing so, the in-memory and paged form primitives 302A and 302B provide uniform persistence 300. In turn, in some embodiments, primary database 102 (of FIG. 1) can load in-memory form primitive 302A into in-memory store 108 (of FIG. 1) in the same form as it is stored in on-disk store 110 (of FIG. 1) (i.e., as a contiguous block of data). Primary database 102 can also load one or more pages 114 (of FIG. 1) of paged form primitive 302B into buffer cache 120 (of FIG. 1).

Further, in some embodiments, using in-memory and paged form primitives 302A and 302B, primary database 102 (of FIG. 1) can load the reconstructed (e.g., decompressed) database object's substructures 304. For example, primary database 102 can use in-memory form primitive 302A to generate the database object's substructures in totality (e.g., a data vector, a dictionary, and, optionally, an index) and store them in in-memory store 108. Likewise, when paged form primitive 302B is stored across multiple pages 114 in on-disk store 110 (of FIG. 1), primary database 102 can load a particular page 114 into buffer cache 120 (of FIG. 1) and, at a later time, reconstruct the portion of the substructure stored on the particular page 114 and save the portion in in-memory store 108. Primary database 102 can also reconstruct the portion of the substructure stored on a particular page 114, store the portion of the substructure on one or more pages 122 (of FIG. 1), and load the pages 122 into buffer cache 120. Primary database 102 can at later time store the data of buffer caches 112 into in-memory store 108. Accordingly, hybrid column store 306 (or 106 of FIG. 1) can store database objects (e.g., database columns) with one or more attributes 306. As illustrated, attributes 306 can include a compressed column, an uncompressed column, a row identifier ("RowID") column, and/or a hash key column, to provide a few examples.

Referring to FIG. 1, primary database 102 can further include advisor 124, resource manager 126, reader context 128, and/or writer context 130. Advisor 124 can provide an initial load configuration for the database object, for example, before processing an application involving the database objects. For example, in some embodiments, an authorized user of primary database 102 can provide the load configuration to advisor 124. Based on the load configuration, primary database 102 can determine whether to generate an in-memory representation and/or a paged representation of the database object (e.g., a database column) or its substructures (e.g., a data vector, a dictionary, and, optionally, an index). Primary database 102 determines the in-memory representation using the in-memory form primitive 112A, and the paged representation using paged form primitive 112B.

As described above, primary database 102 derives a primitive corresponding to the database object or its substructures using one or more compression schemes unique to the database object or its substructures. Accordingly, in-memory form primitive 112A and paged form primitive 112 correspond to a compressed version of the database object or its substructures. After deriving the primitive, primary database 102 can then store an in-memory version of the primitive (referred to as "in-memory form primitive 112A) as a contiguous block of data in on-disk store 110's in-memory form store 116A. Primary database 102 stores a paged primitive (referred to as "paged form primitive 112B") by storing data vector 200A-C—corresponding to the compressed version of a database object or its substructure—on one or more pages 114 in on-disk store 110's paged primitive store 116B. In some embodiments, paged form primitive 112B can comprise data vector stored on one or more pages 116B. Along these lines, paged form primitive store 116B can comprise one or more pages 114 storing data vectors of the same or different paged form primitives 112B.

Accordingly, based on an initial load configuration, primary database 102 can provide an in-memory representation or a paged representation of a database object or its substructure. Along these lines, primary database 102 can provide an in-memory representation or a paged representation of a database object or its substructure for multiple database objects or different structures of a database object. The in-memory and paged representation for the dataset objects and/or substructures of the database objects can be the same or different.

The in-memory representation of the database object or its substructure can correspond to loading in-memory form primitive 112B from in-memory primitive store 116A into in-memory store 108. In some embodiments, primary database 102 can load the in-memory form primitive 112B in the compressed version form for decompressing at a later time. Primary database 102 can also decompress in-memory form primitive 112B and load the decompressed version into in-memory store 108. Accordingly, whether as compressed or decompressed, primary database 102 can load the entire database object or its substructure as a contiguous block of data.

The paged representation of the database object or its substructure can correspond to load one or more pages 114 that correspond to paged form primitive 112B from paged form primitive store 116B into buffer cache 120. In some embodiments, primary database 102 can load one or more pages 114 in their compressed form for decompressing at a later time. Primary database 102 can also decompress data stored on one or more pages 114, store them on other pages, and load the decompressed version into buffer cache 120. Accordingly, unlike in-memory form primitive 112B, primary database 102 can store all or a portion of the database object or its substructure in buffer cache 120.

Advisor 124 can also determine a modified load configuration based on a given workload, for example, of an application. Thus, advisor 124 can provide a change of the initial load configuration based on data access patterns and/or known tradeoffs between primary database 102's memory consumption and performance. In doing so, in some embodiments, advisor 124 can provide an optimal load configuration for the database objects and/or its substructures. The optimal load configuration can optimize the load and processing of primary database 102 and can optimally balance the total cost of ownership with the performance of primary database 102.

Accordingly, based on the modified load configuration, primary database 102 can load data from buffer cache 120's pages 122 into in-memory store 108 as a contiguous block of data. As stated previously, buffer cache 120's pages 122 can store compressed or uncompressed data corresponding to all or a portion of the database object or its substructure. In turn, when buffer cache 120's pages 122 contain compressed data, primary data 102 can decompress the data and store it into in-memory store 108. Likewise, when buffer cache 120's pages 122 store decompressed data, primary data 102 can store the data directly into in-memory store 108.

Further, based on the modified load configuration, when any database object and/or substructure is not stored in in-memory store 108 or buffer cache 120, primary database 102 can generate an in-memory representation or paged representation of the same or different database object and/or its subcomponents. In generating the in-memory representation, primary database 102 can use the in-memory form primitive 112A. And, in generating the paged representation, primary database 102 can use paged form primitive 112B. Accordingly, primary database 102 is able to switch between the paged and in-memory formats without performing a complete rewrite to the database objects and/or substructures.

Along these lines, in some embodiments, advisor 124 can determine the modified load configuration based on a data tiering scheme. For example, the data tiering scheme can specify that smaller and/or more frequently accessed database objects and/or its substructures (e.g., hot data) have an in-memory representation. The data tiering scheme can also specify that larger and/or less frequently accessed database objects and/or substructures thereof (e.g., warm data) have a paged representation. And, the data tiering scheme can further specify that larger and/or rarely accessed database objects and/or substructures (e.g., cold data) not be provided an in-memory or paged representation.

Accordingly, primary database 102 can provide hot data in in-memory store 108 as a contiguous block of data and can provide warm data on one or more pages 122 in buffer cache 120. Thus, when warm data becomes hot data, primary database 102 can load the warm data of buffer cache 120's pages 122 into in-memory store 108. Primary database 102 may evict pages 122 from buffer cache 120 when warm data becomes cold. Similarly, primary database 102 may evict data from in-memory store 108 when hot data becomes cold. Along these lines, advisor 124 can generate and store an in-memory representation of hot data in in-memory store 108. Likewise, advisor 124 can generate and store a paged representation of warm data in one or more pages 122 in buffer cache 120.

As would be understood by a skilled person in the art, hot data relates to accessing the database objects or portions thereof a first predetermined number of times. Warm data relates to accessing the database objects or portions thereof a second predetermined number of times. Cold data relates to accessing the database objects or portions thereof a third predetermined number of times. The hot data's first predetermined number of access times is greater than the warm data's second predetermined number of access times, which is greater than the cold data's third predetermined number of access times. Further, an authorized user can provide the hot data's first predetermined number of access times, the warm data's second predetermined number of access times, and the cold data's third predetermined number of access times.

In determining the optimal load configuration, advisor 124 can tag the database object, its substructures, and/or a portion thereof (e.g., a table, a column, or a partition) with a preferred access type. The preferred access type can indicate that the database object or its substructures be stored in in-memory or paged form. Along these lines, advisor 124 can tag previously stored and/or newly provided database objects and/or its substructures. Previously stored database object and/or its substructures may not be generated to have a uniform persistence format as described above. In contrast, newly provided database objects may be created under the uniform persistence format. Accordingly, previously stored objects and its substructures, as well as newly provided database objects and/or its substructures, can operate with the unified persistence format.

Resource manager 126 can ensure that memory resources using paged memory does not interfere with memory resources allocated for in-memory objects. As described above, buffer cache 120 can store one or more pages 122. In turn, in-memory store 108's memory resources may be required to maintain the pages 122 in buffer cache 120. In some embodiments, in-memory store 108 can also include data vectors as described above, which also require memory resources. Thus, resource manager 126 can determine if there are sufficient memory resources for processing the in-memory store 108's data as well as buffer cache 120's pages 122. If not, resource manager 126 can evict one or more pages 122 from buffer cache 120, for example the "coldest" data as described above, thus freeing up resources for in-memory store 108 to process the in-memory data vectors. Resource manager 126 can continue to evict pages from buffer cache 120 until primary database 102 has sufficient memory resources for processing the in-memory data vectors. Along these lines, resource manager 126 can confirm that buffer cache 120 does not utilize more than 20% of primary database 102's resources.

Reader contexts 128 can permit reading from and writing to decompressed database objects and/or its substructure. Similarly, writer contexts 130 can permit writing to decompressed database objects and/or its substructures. As described above, primary database 102 can store the database object and/or its substructures as a contiguous block of data (e.g., a data vector 200A-C of FIG. 2) in in-memory store 108. And, primary database 102 can store the paged representation of the database object and/or its substructures on one or more pages 122 in buffer cache 120. Accordingly, in some embodiments, for the in-memory representation of the database object, reader and writer contexts 128 and 130 can provide a pointer providing a location of the data vector 200A-C (of FIG. 2) in in-memory store 108. The pointer can be provided to a user for referencing the database object, its substructures, and/or a portion thereof. Further, for the paged representation of the database object, reader and writer contexts 128 and 130 can provide a page handle to maintain pages 122 in buffer cache 120.

Further, as stated above, database system 100 can include primary database 102 and secondary database 104. Secondary database 104 can be on standby and take over if primary database 102 fails. As described above, primary database 102 can provide in-memory and paged representations of database objects. By having this capability, secondary database 104 may not have the same resource configuration. For example, secondary database 104 may only provide an in-memory representation or a paged representation of the database objects. Accordingly, through primary database 102's capability of providing in-memory and paged representations of database objects, database system 100 can have a backup database (e.g., secondary database 104) that has a different resource configuration than the primary database 102.

Figure 4:
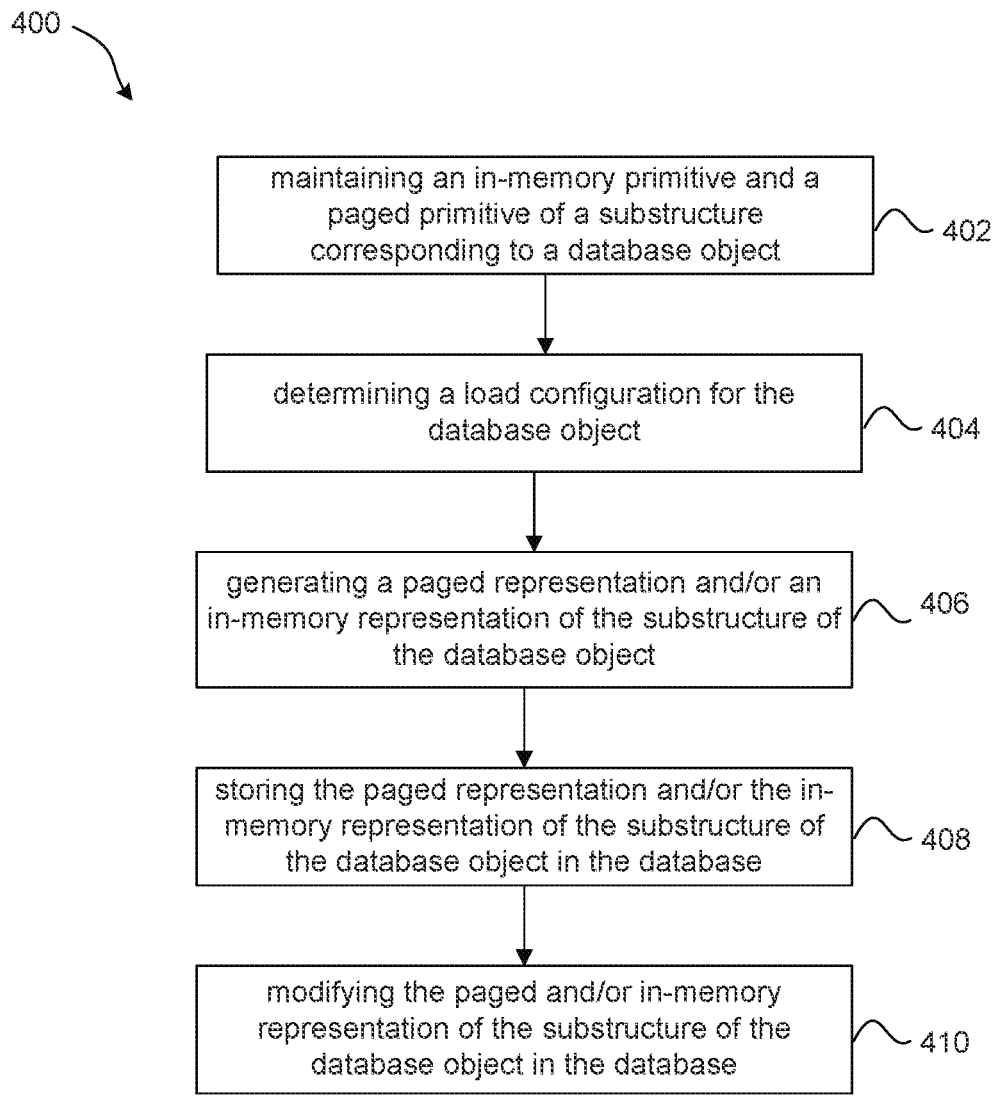
FIG. 4 is a flowchart illustrating a process for generating a paged representation and an in-memory representation of a database object, according to some embodiments.

FIG. 4 is a flowchart for a method 400 for generating a paged representation and an in-memory representation of a database object, according to an embodiment. Method 400 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously or in a different order than shown in FIG. 4, as will be understood by a person of ordinary skill in the art.

Method 400 shall be described with reference to FIGS. 1 and 2. However, method 400 is not limited to those example embodiments.

At 402, primary database 102 can maintain in-memory form primitive 112A and paged form primitive 112B unique to a database object (e.g., a database column) or its substructures (e.g., a data vector, a dictionary, and, optionally, an index) of the database column. The in-memory and paged form primitives 112A and 112B correspond to a primitive derived by primary database 102. In turn, the primitive can correspond to a compressed version of the database objects and/or its substructure.

Accordingly, primary database 102 can store the primitive—e.g., the compressed version of the database object and/or its substructures—in an in-memory form (i.e, in-memory form primitive 112A) and a paged form (i.e., paged form primitive 112B). For example, in-memory form primitive 112A can be provided in on-disk store 110's in-memory form store 116A as a contiguous block of data. Paged form primitive 112B can be stored on one or more pages 114 in on-disk store 110's paged form primitive store 116B. In-memory and paged form primitives 112A and 112B are capable of providing the in-memory representation and the paged representation of the database object, respectively.

At 404, primary database 102 can provide a load configuration for the database object. The load configuration can be predetermined, for example, based on an application. In some embodiments, an authorized user can determine the load configuration.

At 406, primary database can generate the in-memory representation of the database object and/or its substructures using the in-memory primitive 112A. Primary database 102 can generate the paged representation of the database object and/or its substructures using paged form primitive 112B.

At 408, primary database 102 can store the in-memory representation and/or the paged representation of the database object. For example, the in-memory representation of the database object can be stored in in-memory store 108. And, the paged representation of the database object can be stored in buffer cache 120.

In some embodiments, primary database 102 can generate and store database objects and/or its substructures containing hot data in an in-memory form, e.g., in in-memory store 108. Primary database 102 can also generate store database objects and/or its substructures containing warm data in buffer cache 120.

At 410, primary database 102 can provide a modified load configuration for the database object based on, for example, the processing of an application involving the database object. Accordingly, based on the modified load configuration, primary database 102 can load data from buffer cache 120's pages 122 into in-memory store 108 as a contiguous block of data. As stated previously, buffer cache 120's pages 122 can store compressed or uncompressed data corresponding to all or a portion of the database object or its substructure. In turn, when buffer cache 120's pages 122 contain compressed data, primary data 102 can decompress the data and store it into in-memory store 108. Likewise, when buffer cache 120's pages 122 store decompressed data, primary data 102 can store the data directly into in-memory store 108.

Further, based on the modified load configuration, when any database object and/or substructure is not stored in in-memory store 108 or buffer cache 120, primary database 102 can generate an in-memory representation or paged representation of the same or different database object and/or its subcomponents. In generating the in-memory representation, primary database 102 can use the in-memory form primitive 112A. And, in generating the paged representation, primary database 102 can use paged form primitive 112B. Accordingly, primary database 102 is able to switch between the paged and in-memory formats without performing a complete rewrite to the database objects and/or substructures.

Along these lines, in some embodiments, advisor 124 can determine the modified load configuration based on a data tiering scheme. For example, the data tiering scheme can specify that smaller and/or more frequently accessed database objects and/or its substructures (e.g., hot data) have an in-memory representation. The data tiering scheme can also specify that larger and/or less frequently accessed database objects and/or substructures thereof (e.g., warm data) have a paged representation. And, the data tiering scheme can further specify that larger and/or rarely accessed database objects and/or substructures (e.g., cold data) not be provided an in-memory or paged representation.

Accordingly, primary database 102 can provide hot data in on-disk memory 110 as a contiguous block of data and can provide warm data on one or more pages 122 in buffer cache 120. Thus, when warm data becomes hot data, primary database 102 can load the warm data of buffer cache 120's pages 122 into in-memory store 108. Primary database 102 may evict pages 122 from buffer cache 120 when warm data becomes cold. Similarly, primary database 102 may evict data from in-memory 108 when hot data becomes cold. Along these lines, advisor 124 can generate and store an in-memory representation of hot data in in-memory store 108. Likewise, advisor 124 can generate and store a paged representation of warm data one or more pages 122 in buffer cache 120.

Figure 5:
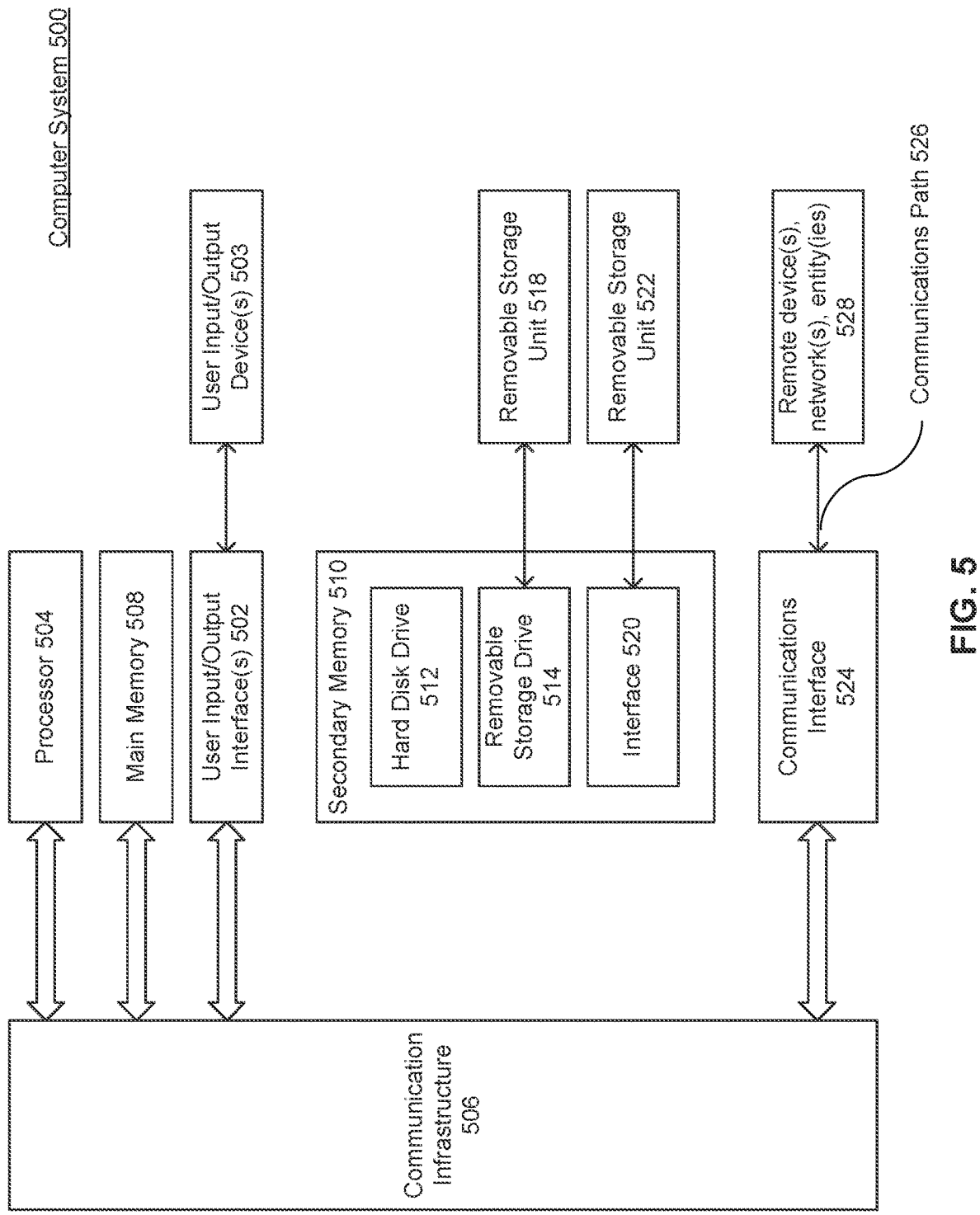
FIG. 5 is an example computer system useful for implementing various embodiments.

Various embodiments may be implemented, for example, using one or more well-known computer systems, such as computer system 500 shown in FIG. 5. One or more computer systems 500 may be used, for example, to implement any of the embodiments discussed herein, as well as combinations and sub-combinations thereof.

Computer system 500 may include one or more processors (also called central processing units, or CPUs), such as a processor 504. Processor 504 may be connected to a bus or communication infrastructure 506.

Computer system 500 may also include user input/output device(s) 503, such as monitors, keyboards, pointing devices, etc., which may communicate with communication infrastructure 506 through user input/output interface(s) 502.

One or more of processors 504 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 500 may also include a main or primary memory 508, such as random access memory (RAM). Main memory 508 may include one or more levels of cache. Main memory 508 may have stored therein control logic (i.e., computer software) and/or data.

Computer system 500 may also include one or more secondary storage devices or memory 510. Secondary memory 510 may include, for example, a hard disk drive 512 and/or a removable storage device or drive 514. Removable storage drive 514 may be a floppy disk drive, a magnetic tape drive, a compact disk drive, an optical storage device, tape backup device, and/or any other storage device/drive.

Removable storage drive 514 may interact with a removable storage unit 518. Removable storage unit 518 may include a computer usable or readable storage device having stored thereon computer software (control logic) and/or data. Removable storage unit 518 may be a floppy disk, magnetic tape, compact disk, DVD, optical storage disk, and/any other computer data storage device. Removable storage drive 514 may read from and/or write to removable storage unit 518.

Secondary memory 510 may include other means, devices, components, instrumentalities or other approaches for allowing computer programs and/or other instructions and/or data to be accessed by computer system 500. Such means, devices, components, instrumentalities or other approaches may include, for example, a removable storage unit 522 and an interface 520. Examples of the removable storage unit 522 and the interface 520 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 500 may further include a communication or network interface 524. Communication interface 524 may enable computer system 500 to communicate and interact with any combination of external devices, external networks, external entities, etc. (individually and collectively referenced by reference number 528). For example, communication interface 524 may allow computer system 500 to communicate with external or remote devices 528 over communication path 526, which may be wired and/or wireless (or a combination thereof), and which may include any combination of LANs, WANs, the Internet, etc. Control logic and/or data may be transmitted to and from computer system 500 via communication path 526.

Computer system 500 may also be any of a personal digital assistant (PDA), desktop workstation, laptop or notebook computer, netbook, tablet, smart phone, smart watch or other wearable, appliance, part of the Internet of Things (IoT), and/or embedded system, to name a few non-limiting examples, or any combination thereof.

Computer system 500 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), database as a service (DBaaS), etc.); and/or a hybrid model including any combination of the foregoing examples or other services or delivery paradigms.

Any applicable data structures, file formats, and schemas in computer system 500 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 500, main memory 508, secondary memory 510, and removable storage units 518 and 522, as well as tangible articles of manufacture embodying any combination of the foregoing. Such control logic, when executed by one or more data processing devices (such as computer system 500), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 5. In particular, embodiments may operate with software, hardware, and/or operating system implementations other than those described herein.

It is to be appreciated that the Detailed Description section, and not any other section, is intended to be used to interpret the claims. Other sections may set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries may be defined as long as the specified functions and relationships (or equivalents thereof) are appropriately performed. Also, alternative embodiments may perform functional blocks, steps, operations, methods, etc. using orderings different than those described herein.

References herein to "one embodiment," "an embodiment," "an example embodiment," "some embodiments," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

The invention claimed is:

1. A database system, comprising:
   a hybrid column store, comprising:
   an in-memory store including a buffer cache configured to store a representation of a database object;
   an on-disk store comprising an in-memory primitive store and a paged primitive store including one or more pages located outside the buffer cache, and configured to store a primitive for the representation of the database object, wherein the primitive is saved as an in-memory form primitive in the in-memory primitive store as a compressed version of the representation of the database object by a contiguous block of data or a paged form primitive in the paged primitive store as a compressed version of the representation of the database object on the one or more pages of the paged primitive store, wherein the in-memory form primitive and the paged form primitive are a byte-compatible representation of the database object to provide a unified persistence format for the database object.

2. The database system of claim 1, wherein the representation of the database object includes the database object or a substructure of the database object.

3. The database system of claim 2, wherein the substructure of the database object includes a dictionary, a data vector, an index, one or more values, or one or more value identifiers corresponding to the one or more values.

4. The database system of claim 1, wherein the database object includes a database column containing one or more values.

5. The database system of claim 1, wherein the in-memory form primitive and the paged form primitive have a same application program interface (API).

6. The database system of claim 1, wherein the primitive contains a compressed version of the representation of the database object that is derived by using one or more compression schemes selected from an n-bit compression, a range compression, and an offset compression.

7. The database system of claim 1, wherein the in-memory primitive store is configured to save the in-memory form primitive.

8. The database system of claim 1, wherein the hybrid column store is included in a primary database, and the database system further comprises a secondary database provides only an in-memory representation or a paged representation of the database object.

9. The database system of claim 1, wherein the in-memory store is configured to further include a tag for the database object to indicate that the representation of the database object is stored as the in-memory form primitive or the paged form primitive.

10. The database system of claim 1, wherein the in-memory store further includes a buffer cache storing one or more pages retrieved from the paged primitive store.

11. A method performed by a database system, comprising:
    performing one or more compression schemes on a database object or a substructure of the database object to derive a primitive for the database object or the substructure of the database object, wherein the database object or the substructure of the database object is stored in an in-memory store; and
    saving the primitive as an in-memory form primitive in an in-memory primitive store or a paged form primitive in a paged primitive store, wherein the in-memory form primitive and the paged form primitive are a byte-compatible representation of the database object or the substructure of the database object to provide a unified persistence format for the database object.

12. The method of claim 11, further comprising:
    loading one or more pages of the paged primitive store into a buffer cache of the in-memory store; and
    decompressing one or more database objects stored in the buffer cache.

13. The method of claim 11, further comprising:
    creating the substructure of the database object to represent the database object; and,
    deriving the primitive for the substructure of the database object.

14. The method of claim 11, further comprising:
    receiving a load configuration;
    determining, based on the load configuration, whether to save the primitive as the in-memory form primitive in the in-memory primitive store or the paged form primitive in the paged primitive store.

15. The method of claim 11, wherein the in-memory form primitive and the paged form primitive have a same application program interface (API).

16. The method of claim 11, wherein the substructure of the database object includes a dictionary, a data vector, an index, one or more values, or one or more value identifiers corresponding to the one or more values.

17. A non-transitory computer-readable device having instructions stored thereon that, when executed by a computing device, cause the computing device to perform operations comprising:
    performing one or more compression schemes on a database object or a substructure of the database object to derive a primitive for the database object or the substructure of the database object, wherein the database object or the substructure of the database object is stored in an in-memory store; and
    saving the primitive as an in-memory form primitive in an in-memory primitive store or a paged form primitive in a paged primitive store, wherein the in-memory form primitive and the paged form primitive are a byte-compatible representation of the database object or the substructure of the database object to provide a unified persistence format for the database object.

18. The non-transitory computer-readable device of claim 17, wherein the in-memory form primitive and the paged form primitive have a same application program interface (API).

19. The non-transitory computer-readable device of claim 18, wherein the substructure of the database object includes a dictionary, a data vector, an index, one or more values, or one or more value identifiers corresponding to the one or more values.

20. The non-transitory computer-readable device of claim 17, wherein the database object includes a database column containing one or more values.

* * * * *